(12) United States Patent
Pillilli et al.

(10) Patent No.: US 12,204,912 B2
(45) Date of Patent: Jan. 21, 2025

(54) BOOTING AND USING A SINGLE CPU SOCKET AS A MULTI-CPU PARTITIONED PLATFORM

(71) Applicant: Intel Corporation, Santa Clara, CA (US)

(72) Inventors: Bharat S. Pillilli, El Dorado Hills, CA (US); Johan Van De Groenendaal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 670 days.

(21) Appl. No.: 17/384,447

(22) Filed: Jul. 23, 2021

(65) Prior Publication Data

US 2021/0349731 A1 Nov. 11, 2021

(51) Int. Cl.
*G06F 9/4401* (2018.01)
*G06F 13/20* (2006.01)
*G06F 13/42* (2006.01)

(52) U.S. Cl.
CPC ............ *G06F 9/4403* (2013.01); *G06F 13/20* (2013.01); *G06F 13/4282* (2013.01); *G06F 9/4405* (2013.01)

(58) Field of Classification Search
CPC .... G06F 13/20; G06F 13/4282; G06F 9/4403; G06F 9/4405
See application file for complete search history.

(56) References Cited

U.S. PATENT DOCUMENTS

| | | | |
|---|---|---|---|
| 2016/0179184 A1* | 6/2016 | Shah | G06F 9/5094 713/320 |
| 2019/0236038 A1* | 8/2019 | Choudhary | G06F 13/20 |
| 2020/0183738 A1* | 6/2020 | Champigny | G06F 9/5016 |
| 2020/0183872 A1* | 6/2020 | Srivastava | G06F 9/4418 |

* cited by examiner

*Primary Examiner* — Terrell S Johnson
(74) *Attorney, Agent, or Firm* — Compass IP Law PC

(57) ABSTRACT

Apparatus and methods for booting and using a single CPU socket as a multi-CPU partitioned platform. The single CPU socket includes a plurality of core tiles that a partitioned into a plurality of virtual clusters comprising CPU sub-sockets. Each of the CPU sub-sockets in coupled to an Input-Output (IO) tile having an integrated boot support block and comprising a plurality of IO interfaces including at least one IO interface configured to receive boot signals for booting the sub-sockets and an IO interface to access boot firmware stored in a firmware storage device coupled to the IO interface. The integrated boot support block is configured to facilitate booting of each of the plurality of CPU sub-sockets using a shared set of boot resources coupled to the plurality of IO interfaces.

20 Claims, 7 Drawing Sheets

BOOTING AND USING A SINGLE CPU SOCKET AS A MULTI-CPU PARTITIONED PLATFORM

BACKGROUND INFORMATION

Some compute platforms in data center, high-performance computing (HPC) and other environments are multi-socket platform including two or more central processing units (CPUs). For most multi-socket platforms, the sockets are interconnected via socket-to-socket links, and there may be provisions for sharing platform resources across sockets, such as a network interface controller (NIC) and memory as part of a non-uniform memory access (NUMA) architecture.

One problem with multi-socket platforms is failure and/or data corruption on one CPU may corrupt and/or bring down the rest of the CPUs on the same platform. This problem is referred to as the "blast radius," with the objective to minimize the blast radius when a CPU fails and/or encounters data corruption issues. In some instances, this problem is addressed by partitioning the platform multiple separate sets of full hardware resources (one for each socket), where each socket operates in isolation from the other sockets. However, this comes with an increased cost and also limits the utilization of multiple CPUs on the same platform. Moreover, this approach requires separate hardware resources for booting each CPU.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
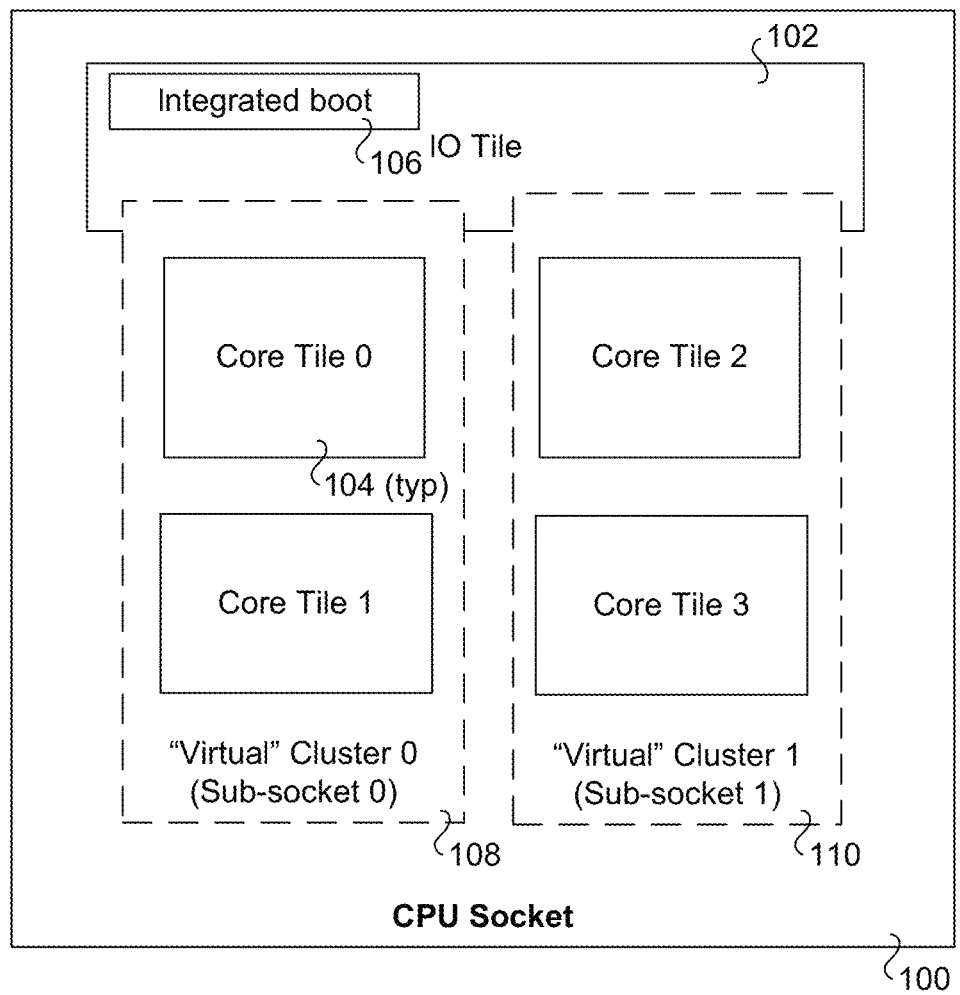
FIG. 1 is a schematic diagram of a simplified example of a multi-dielet partitionable CPU.

Embodiments of apparatus and methods for booting and using a single CPU socket as a multi-CPU partitioned platform are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar TLP components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 shows a simplified example of a multi-dielet partitionable CPU 100 (also called a CPU socket) used for server CPUs, where blocks of circuitry representing portions of a CPU die are referred to as "dielets" and "tiles" herein. CPU socket 100 includes an Input-Output (IO) tile 102 and four core "dielets" (tiles) 104, as depicted by Core Tiles 0, 1, 2, and 3. IO tile 102 includes an integrated boot support block 106. During CPU socket boot, Core Tiles 0 and 1 are assigned to a first virtual cluster 108 ("Virtual" Cluster 0), while Core Tiles 2 and 3 are assigned to a second virtual cluster 110 ("Virtual" Cluster 1) at platform bring up time using GPIO (General-Purpose IO) straps. Virtual Clusters 0 and 1 comprise "sub-sockets" 0 and 1.

IO tile 102 hosts all the required functionality to independently support BIOS & OS required functionality in addition to high-speed IOs. Integrated boot support block is a shared hardware block that is shared between and accessed by both the virtual clusters with no duplication.

In one embodiment, each virtual cluster can behave as an independent "legacy" socket where BIOS and OS gets a full "legacy" cycle functional capability. Definition of "Legacy" from platform/BIOS/OS include memory-mapped IO (MMIO) targeting flash and trusted platform management (TPM); IO cycles accessing one or more of LPC (Low Pin Count), HPET, RTC, 8254, 8259, IOxAPIC; CFG cycles targeting the platform visible devices; and LT/TXT cycles.

The dotted line extension shows that virtual cluster domain may physically be part of IO tile 102 (or otherwise coupled to the IO tile) but the isolation will remain to be equivalent to "2" CPUs. The isolation aspect enables a given virtual cluster to encounter a hardware error and/or data corruption without adversely impacting other clusters on a CPU socket.

In one embodiment, each virtual cluster that acts as a legacy socket already carries the required information (current systems term it as "socket ID," which is equivalent to "cluster ID") as a part of its TLP (transaction layer protocol) packets. If each of the virtual clusters are strapped as "legacy", integrated boot support block 106 maintains strict partitioning between transactions by using the cluster ID indication in the TLP. This novel functionality enables the support of multiple virtual legacy sockets/clusters within the CPU to boot the BIOS and OS and allow them to safely run.

Figure 2:
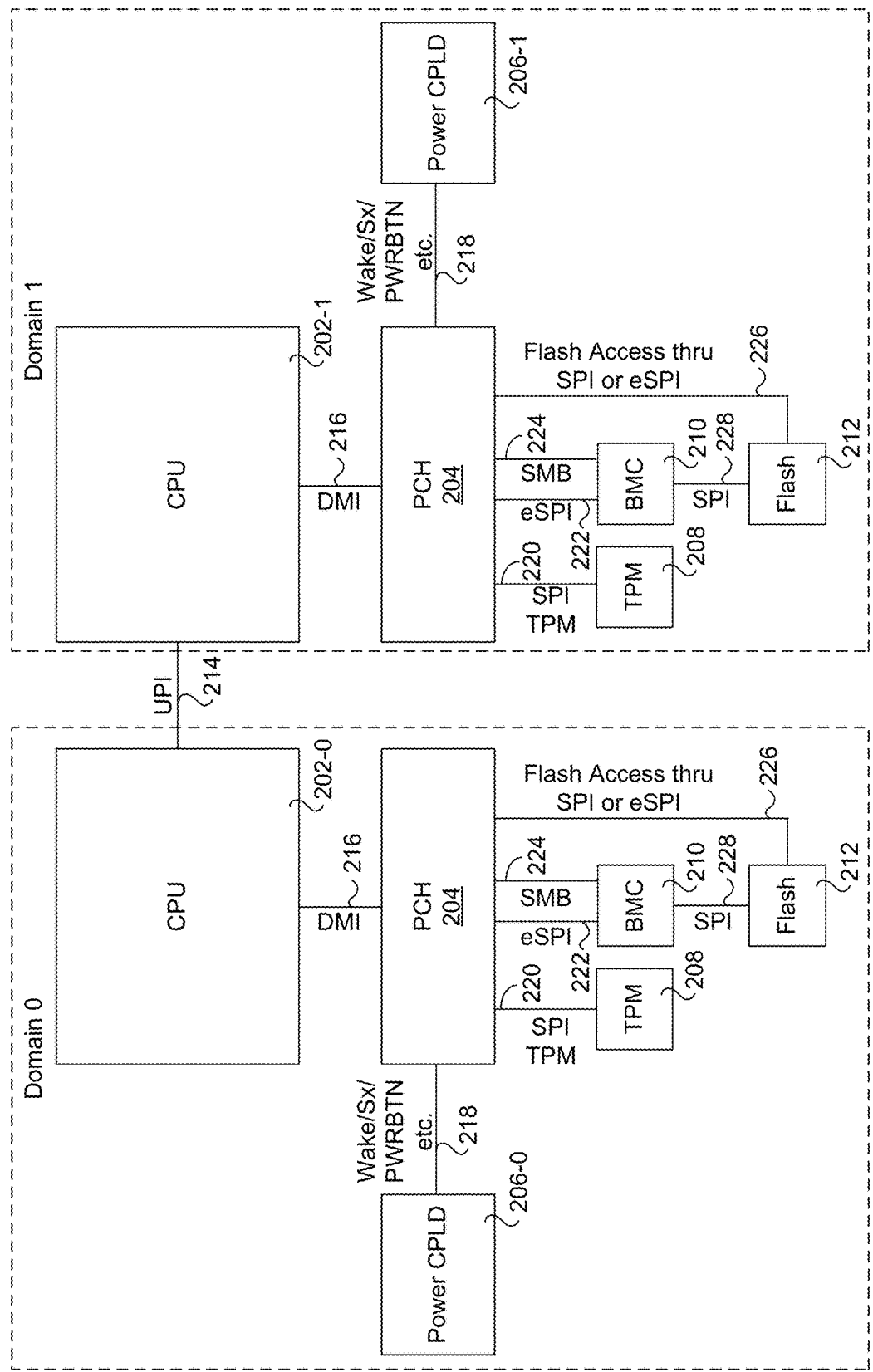
FIG. 2 is a schematic diagram of a first two-socket platform including a pair of Platform Controller Hubs (PCHs) coupled to respective CPUs.

FIG. 2 shows a two-socket platform 200 including CPUs 202-0 and 202-1. Each CPU is coupled to its own set of hardware resources including a platform controller hub (PCH) 204, a respective power CPLD (complex programmable logic device) 206-0 or 206-1, a trusted platform module (TPM) 208, a baseboard management controller (BMC) 210, and a flash storage device 212. CPUs 202-0 and 202-1 are interconnected via a socket-to-socket interconnect 214, which in the illustrated example is an Ultra Path Interconnect (UPI). Each of CPUs 202-0 and 202-1 is connected to its respective PCH 204 via a Direct Media Interface (DMI) 216.

Power CPLD 206-0 and 206-1 provides various inputs to a respective PCH 204, such as wake signals, power state control (Sx) signals, power button signals, etc. TPM 208 is connected to PCH 204 via a serial peripheral interface (SPI) TMP link 220. BMC 210 is connected to PCH 204 via an enhanced serial peripheral interface (eSPI) link 222 and via a serial management bus (SMB) 224. In addition to the links shown, other types of low pin count (LPC) buses may be used.

Platform firmware (aka BIOS) is stored in flash storage device 212, which is coupled to PCH 204 via an SPI or eSPI link 226 and coupled to BMC 210 via an SPI link 228. In the illustrated example, each of CPU 202-0 and 202-1 is associated with a respective domain (0 and 1). The circuitry in each domain operates independent from the circuitry in the other domain (except for communications via socket-to-socket interconnect 214). In the illustrated example, each domain has its own BIOS storage device (Flash storage device 212). Under an alternative configuration (not shown), there is a single BIOS storage device for the two-socket platform. In some embodiment, the platform firm comprises Unified Extensible Firmware Interface (UEFI) firmware.

Figure 2A:
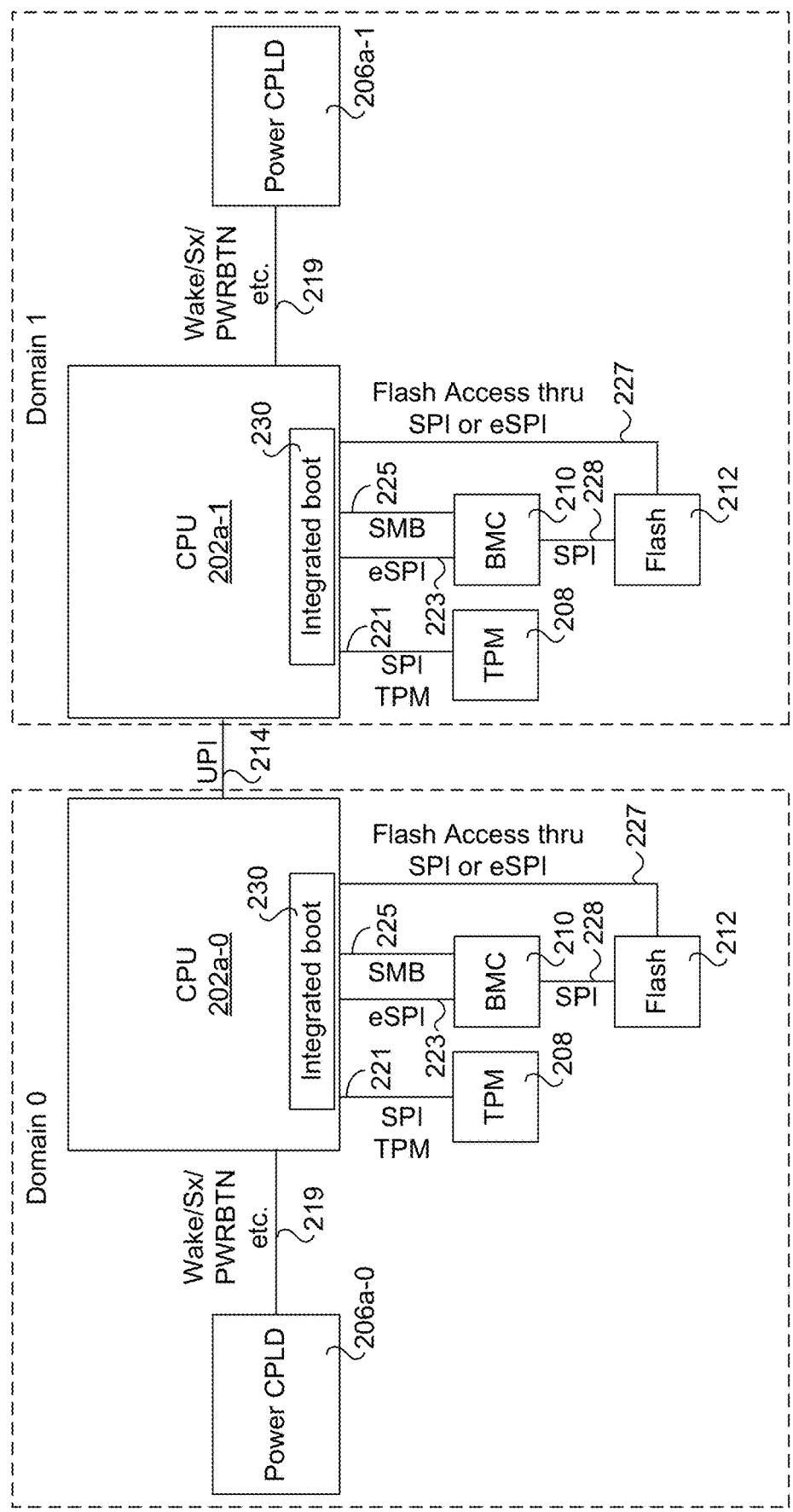
FIG. 2a is a schematic diagram of a second two-socket platform in which the CPUs include integrated boot support blocks.

FIG. 2a shows a two-socket platform 200a comprising another two-socket platform configuration employing integrated boot support blocks 230 in each of CPUs 202a-0 and 202a-1. As further shown, PCHs 204 have been removed, with each of TPM 208, BMC 210, and flash storage device 212 being directly connected to the CPU 202a in its domain. Thus, in domain 1 TPM 208 is connected to CPU 202a-0 via an SPI TPM link 221, BMC 210 is connected to CPU 202a-0 via an eSPI link 223 and via SMB 225, and flash storage device 212 is connected to CPU 202a-0 via an SPI or eSPI link 227.

Under two-socket platform 200a, each of power CPLD 206a-0 and 206a-1 sends various signals 219 directly to CPU 202a-0 and 202a-1, respectively. It is noted that the logic in CPLD 206a-0 and CPLD 206a-1 may differ from CPLD 206-0 and CPLD 206-1 since under platform 200 in FIG. 2 the PCHs are what provides control signals and other communications with CPUs 202-0 and 202-1, while under platform 200a CPLDs 206a-0 and 206a-1 are in direct communication with CPUs 202a-0 and 202a-1. Those skilled in the art will appreciate that selected platform components are illustrated in FIGS. 2 and 2a, while an actual platform would include additional components including memory controllers and system memory. Rather, the components and links/interfaces shown in FIGS. 2 and 2a are focused on what are employed for booting the CPUs and preparing their respective domains for subsequent booting of an OS and runtime operation.

Figure 3:
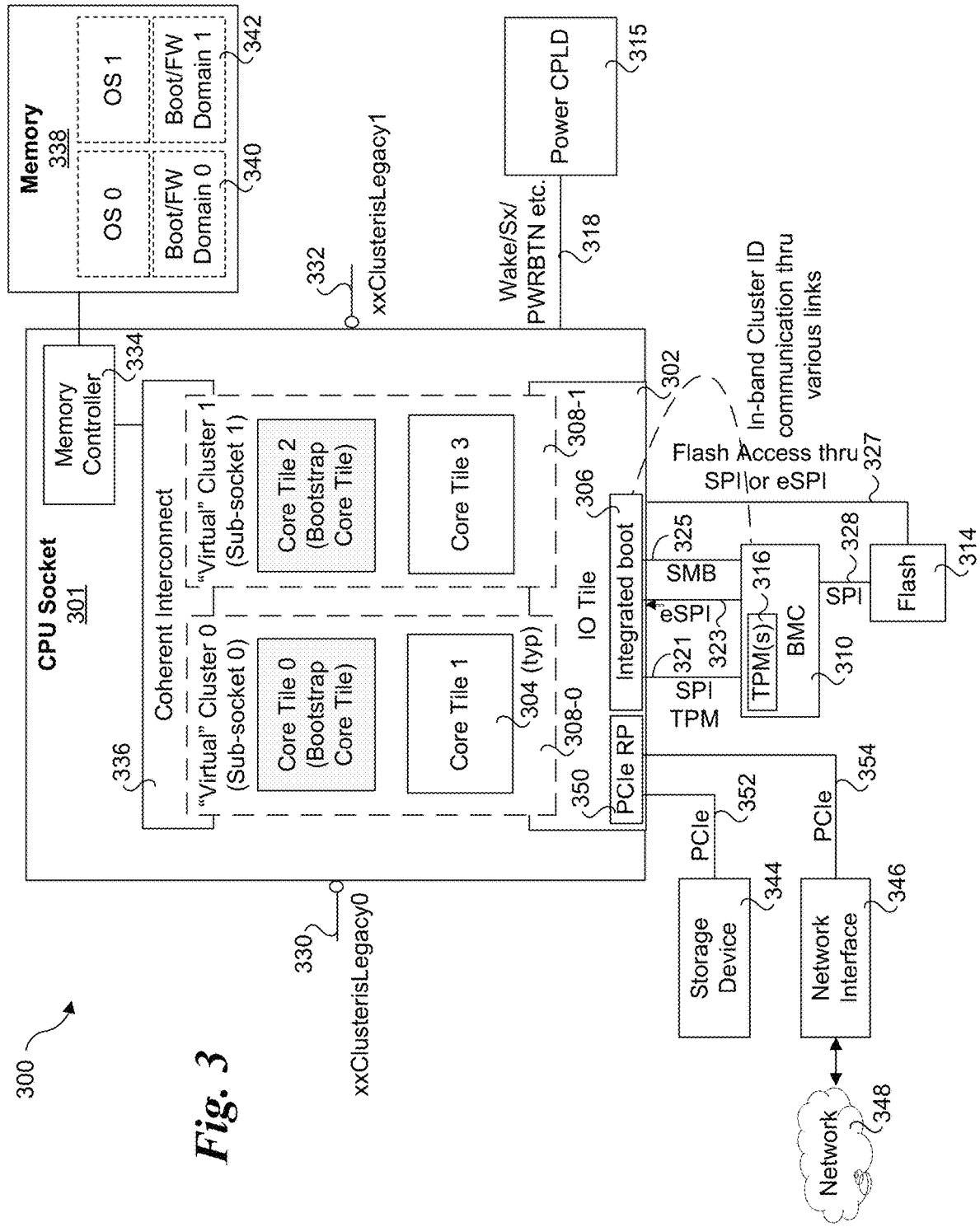
FIG. 3 is a schematic diagram of a single-socket platform architecture in which core tiles in a CPU socket are partitioned into multiple clusters comprising sub-sockets.

FIG. 3 shows a platform architecture 300 for a single CPU socket 301 coupled to a set of platform resources and implementing the virtual cluster partitioning aspect of CPU 100 in FIG. 1 with aspects of two-socket platform 200a. As with CPU socket 100, CPU socket 301 includes core dielets (tiles) 304 (Core Tile 0, 1, 2, and 3) that are assigned to respective virtual clusters 308-0 and 308-1 during platform boot. One of the core tiles for each virtual cluster is assigned as the bootstrap core tile for the sub-socket, as depicted by core tile 0 and core tile 2. CPU socket 301 also includes an IO tile 302 comprising IO circuitry that is shared between circuitry in virtual clusters 308-0 and 308-1 and including an integrated boot support block 306.

The platform resources include boot resources comprising a BMC 310, a flash storage device 314. In the illustrated embodiment, BMC 310 includes one or more TPMs 316. Alternatively, the TPM(s) may be implemented as discrete components. BMC 310 is coupled to CPU socket 301 via an SPI TPM link 321, an eSPI link 323, and an SMB 325. Flash storage device 314 is connected to CPU socket 301 via an SPI or eSPI link 327 and to BMC 310 via an SPI link 328.

A power CPLD 315 provided various inputs 318 to CPU socket 301, such as wake signals, Sx signals, power button signals, etc. CPU socket 301 also includes inputs 330 and 332 to determine whether a virtual cluster is operated as a legacy cluster or not.

CPU socket 301 further includes a memory controller 334 coupled to a coherent interconnect 336 to which each of virtual clusters 308 and 310 are operatively coupled. Coherent interconnect 336 is an abstraction that represents a coherent memory domain comprising a cache hierarchy (e.g., Level 1 (L1), Level 2 (L2) and a Last Level Cache (LLC)) and associated cache agents and interconnect circuitry. Memory controller 334 is coupled to and provides Read and Write access to memory 338, which is used to store various firmware and software components, including respective instances of an operating system (OS 0 and OS 1) and boot and runtime BIOS/Firmware (FW), as depicted by Boot/FW Domain 0 (340) and Boot/FW Domain 1 (342).

Platform architecture 300 further includes a storage device 344 and network interface 346 configured to be coupled to a network 348. Each of storage device 344 and network interface 346 is connected to a PCIe (Peripheral Component Interconnect Express) Root Port (RP) on IO tile 302 via respective PCIe links 352 and 354. In one embodiment, all or a portion of platform software, such as an operating system, is stored in storage device 334 and loaded into memory 336.

In one aspect, to support multiple independent legacy clusters/virtual sockets, and reduce the overall cost, the proposal is to flash, SPI/eSPI into a single BMC for both clusters (BMCs are already built to handle one flash, SPI/eSPI etc.) and use the integrated boot support block in the CPU to enumerate the cluster ID per transaction.

This enumeration can also be as simple as issuing a cluster ID cycle followed by a relevant cycle (flash, SPI, eSPI etc.) or asserting a mutually exclusive platform programmable GPIO (outputs) that indicate transaction cluster type reaching the BMC. In one embodiment, when the TPM(s) are integrated on the BMC a special protocol can also be integrated to the BMC that uses the above enumeration methodology to detect specific clusters.

Figure 4:
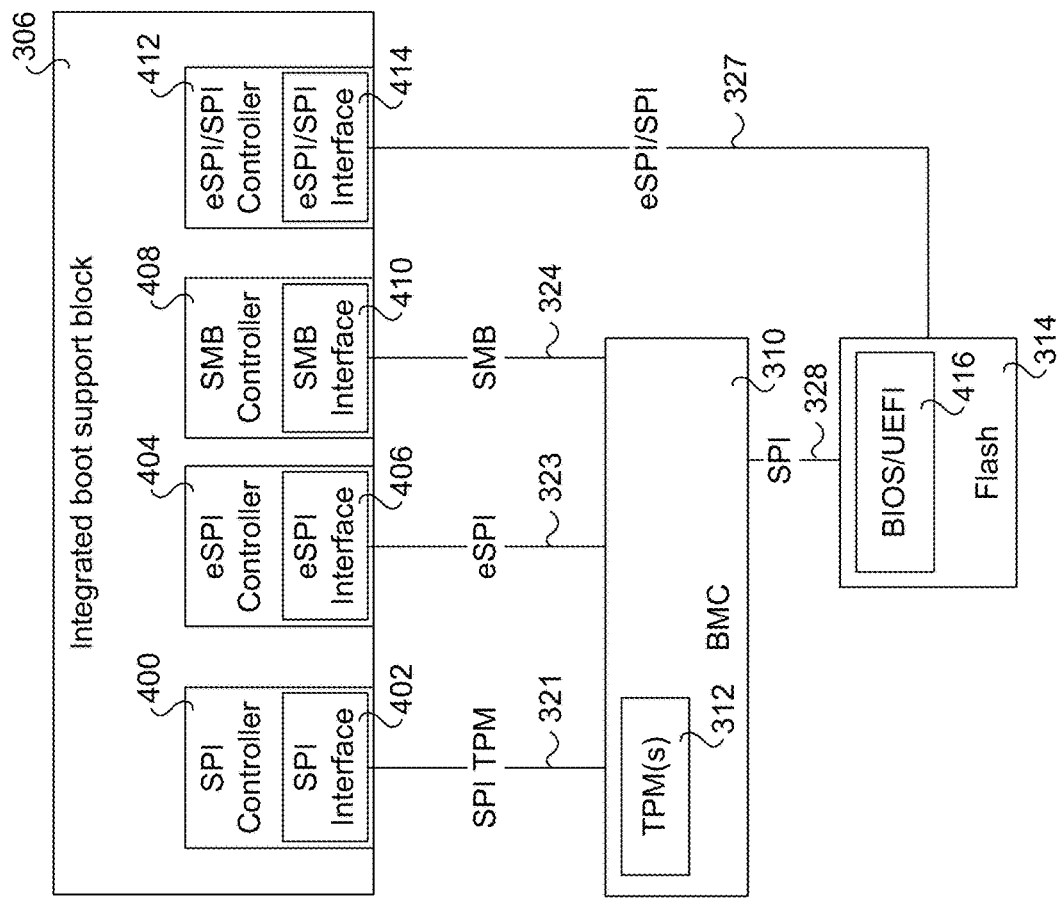
FIG. 4 is a schematic diagram illustrating further details of an integrated boot support block, according to one embodiment.

FIG. 4 shows further details of integrated boot support block 306, according to one embodiment. In this non-limiting example integrated boot support block 306 includes a plurality of IO controllers with integrated IO interfaces. These include an SPI controller 400 with SPI interface 402, an eSPI controller 404 with eSPI interface 406, an SMB controller 408 with SMB interface 410, and an eSPI or SPI controller 412 with an eSPI or SPI interface 414. Under an alternative configuration (not shown), the IO controllers and IO interfaces are separate. As further shown, BIOS/UEFI firmware 416 is stored in flash storage device 314.

Cluster/Sub-Socket Booting

Figure 5:
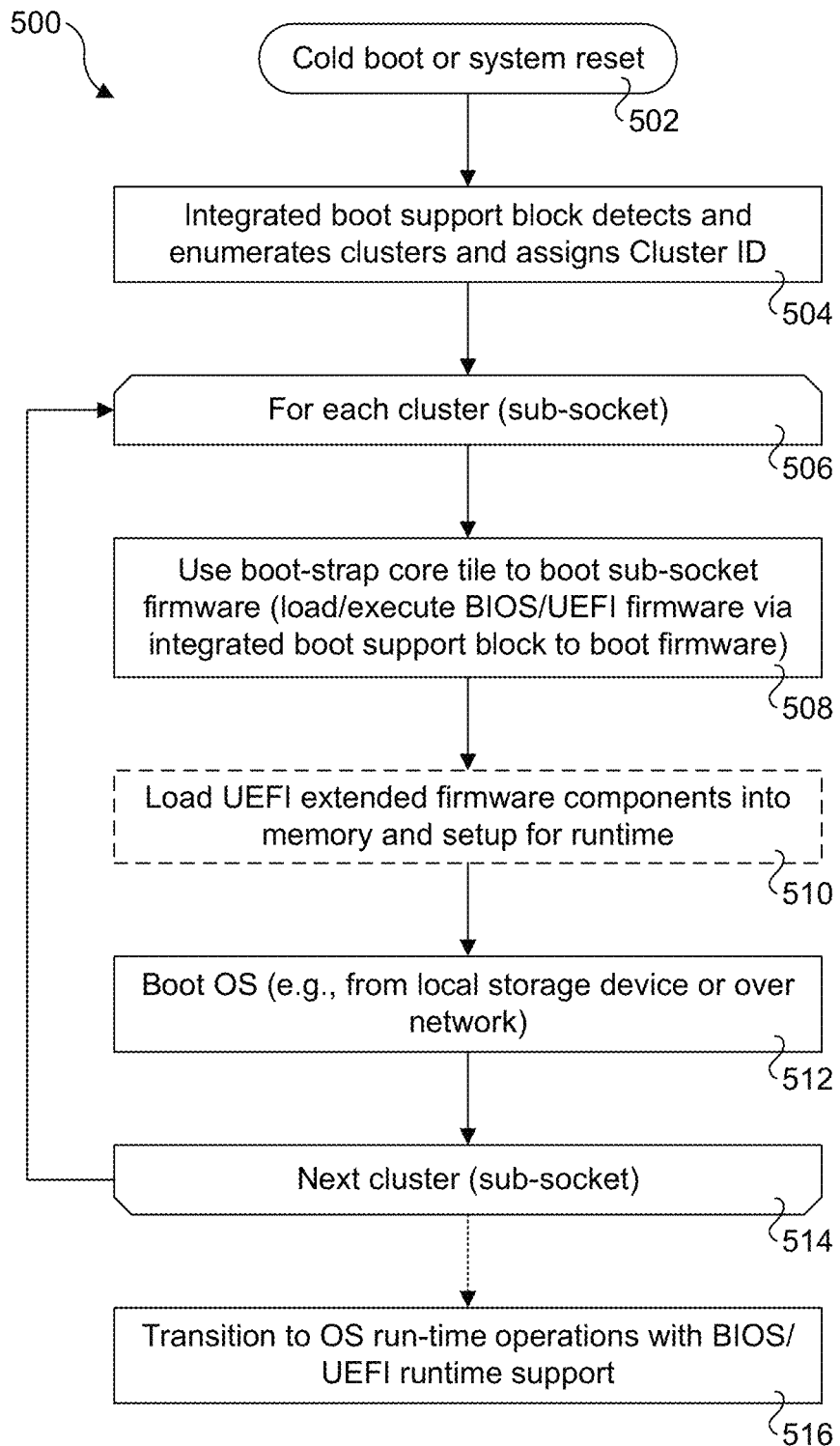
FIG. 5 is a flowchart illustrating operations for booting sub-sockets in the single-socket platform of FIG. 3.

With reference to a flowchart 500 in FIG. 5 and platform architecture 300 in FIG. 3, booting of a CPU socket with core tiles partitioned for two or more sub-sockets proceeds as follows. The boot process begins as part of a cold boot or a system reset, as show in a start block 502. In a block 504 the integrated boot support block (and/or other logic on the platform) detects and enumerated the virtual clusters and assigns a Cluster ID to each virtual cluster. In one embodiment, this discovery and enumeration process is as discussed above. The Cluster ID is used for forwarding data (contained in TLPs) during boot operations.

As depicted by start and end loop block 506 and 514, the operations in blocks 508, 510 and 512 are performed for each cluster that is detected and enumerated in block 504. In a block 508, the boot-strap core tile for the cluster is used to boot the sub-socket firmware by loading and executing BIOS and/or UEFI firmware that is stored in flash storage device 314. Booting an individual sub-socket is somewhat similar to conventional booting of a single-socket platform, with the further addition of message forwarding via integrated boot support block 306.

Let us consider booting of sub-socket 0 using core tile 0 as the bootstrap core tile. The instruction pointer of core tile 0 will identify an address in flash storage device 314 from where to begin loading and executing the BIOS/UEFI firmware for the platform. A portion of the BIOS/UEFI firmware will be executed directly from flash storage, while other portions will be loaded into memory in Boot/FW domain 0. This will prepare sub-socket 0 for booting an OS instance and to provide firmware support for platform runtime operations. This includes loading UEFI extended firmware components into memory, as depicted by an optional block 510 (this block would be skipped for platforms not using UEFI firmware). After the BIOS/FW has been booted, the operating system instance for the sub-socket is booted. For example, if the OS is stored in storage device 344, the OS is accessed from storage device 344 using PCIe TLPs, with the OS instance being loaded into memory 338, as depicted by OS 0.

A similar boot process is performed using core tile 2 to boot sub-socket 1. For platforms with CPU sockets partitioned into more than two sub-sockets, a similar process would be used for each sub-socket. In one embodiment, following booting of each of the sub-sockets, execution is transitioned from a boot phase to an OS runtime phase to support runtime operations using the BIOS/UEFI runtime support set up during the proceeding boot phase, as shown in a block 516. Optionally, the transition to OS runtime phase may be performed independently for each sub-socket.

Figure 6:
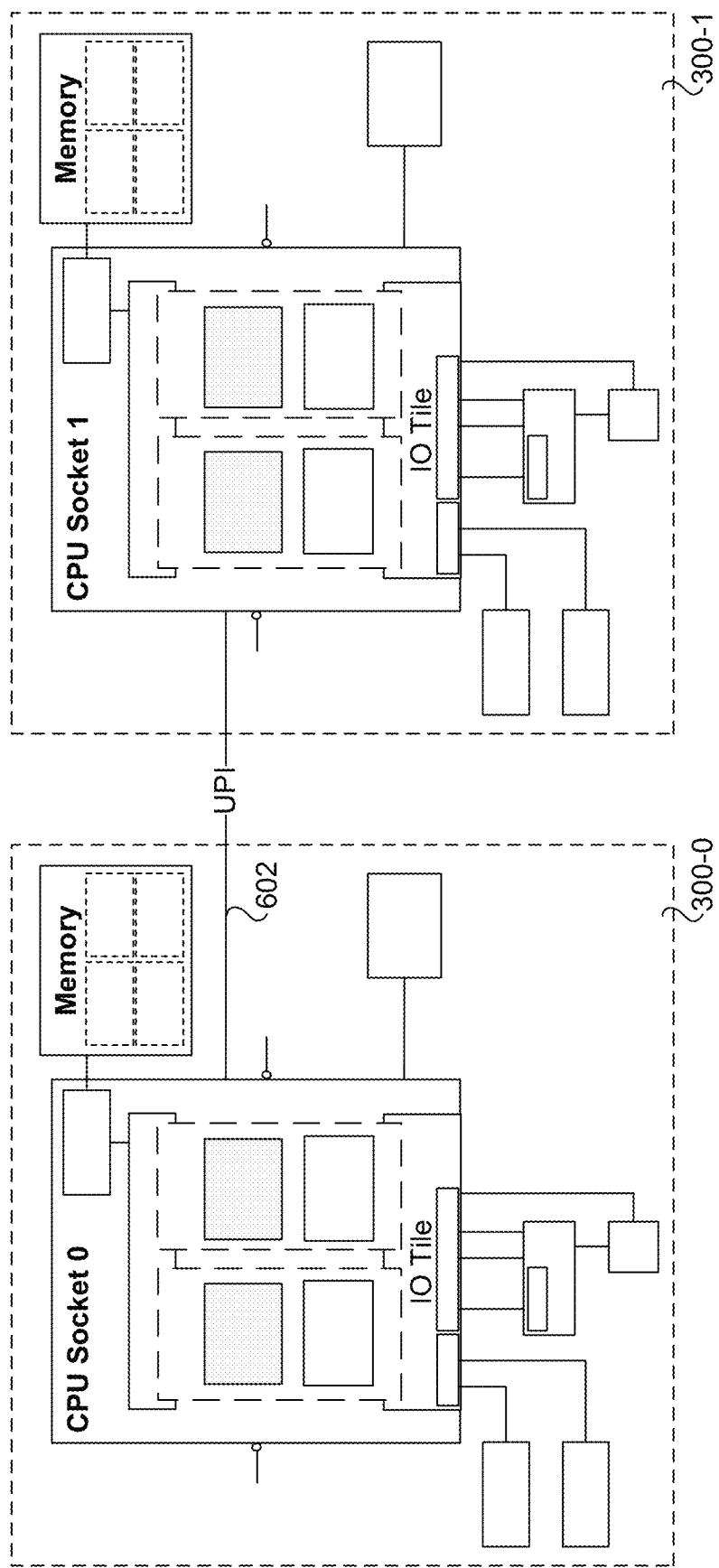
FIG. 6 is schematic diagram illustrating an abstracted view of a two-socket platform employing replication of the single socket platform of FIG. 3.

The single-socket platform architecture of FIG. 3 can be replicated two or more times in a multi-socket platform. For example, FIG. 6 shows an abstracted view of a two-socket platform including CPU sockets 0 and 1 interconnected via a socket-to-socket UPI link 602. Each of the sockets include an architecture similar to that shown as platform architecture 300 in FIG. 3 discussed above, as depicted by circuit blocks 300-0 and 300-1. As similar approach may be used in a four-socket platform, where circuit block 300 would be replicated four times and the CPU sockets would be connected by pairs of socket-to-socket interconnects. Generally, for a four-socket platform, the socket-to-socket interconnects may comprise a loop configuration where each socket is connected to two other sockets.

As aspect of a multi-socket platform employing the principles and teachings above is that each socket has its own set of boot resources, such as a BMC and flash storage device in one non-limiting example. Likewise, each socket would have its own memory and the CPU sub-sockets for each socket would be booted independently from CPU sub-sockets in other sockets. At the same time, other components may be shared across sockets. For example, a storage device such as a solid state disk (SSD) or similar mass storage device might be shared across sockets. In another example configuration, a single multi-port network interface is shared across sockets, such as a multi-port network interface controller (NIC) comprising a SmartNIC including logic for use in a multi-socket platform.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A central processing unit (CPU) socket, comprising:
a plurality of core tiles;
an Input-Output (IO) tile, having an integrated boot support block and comprising a plurality of IO interfaces including at least one IO interface configured to receive boot signals and boot firmware; and
logic for partitioning the plurality of cores tiles into a plurality of virtual clusters comprising CPU sub-sockets, wherein each CPU sub-socket is coupled to the IO tile,
wherein the integrated boot support block is configured to facilitate booting of each of the plurality of CPU sub-sockets.

2. The CPU socket of claim 1, further comprising an input for each CPU sub-socket to receive a signal indicating whether the CPU sub-socket is to be operated as a legacy socket.

3. The CPU socket of claim 1, wherein the plurality of IO interfaces includes at least one IO interface to communicate with a baseband management controller (BMC).

4. The CPU socket of claim 3, wherein the at least one IO interface to communicate with a BMC includes a system management bus (SMB) and a serial peripheral interface (SPI) or enhanced serial peripheral interface (eSPI).

5. The CPU socket of claim 1, wherein each of the CPU sub-sockets comprises an independent boot domain.

6. The CPU socket of claim 1, wherein each of the plurality of sub-sockets includes a core tile that is used as a bootstrap core tile.

7. The CPU socket of claim 1, wherein the plurality of IO interfaces includes an IO interface to support communication with one or more trusted platform module (TPMs) or a device in which one or more TPMs are embedded.

8. The CPU socket of claim 1, wherein the integrated boot support block includes a plurality of IO controllers.

9. The CPU socket of claim 8, wherein the plurality of IO controllers includes at least one enhanced serial peripheral interface (eSPI) controller and a system management bus (SMB) controller.

10. The CPU socket of claim 8, wherein the plurality of IO interfaces are integrated in or integrated with respective IO controllers.

11. A computing platform comprising:
a firmware storage device in which platform firmware including boot firmware is stored;
a management device; and
a central processing unit (CPU) socket, including,
   a plurality of core tiles;
   an Input-Output (TO) tile, having an integrated boot support block and having a plurality of IO interfaces including at least one IO interface configured to receive boot signals from the management device and including an IO interface coupled via an IO link to the firmware storage device; and
   logic for partitioning the plurality of cores tiles into a plurality of virtual clusters comprising CPU sub-sockets, wherein each CPU sub-socket is coupled to the IO tile,
   wherein the CPU socket is configured to access the boot firmware from the firmware storage device and the integrated boot support block is configured to facilitate booting of each of the plurality of CPU sub-sockets.

12. The compute platform of claim 11, wherein the management device comprises a baseboard management controller (BMC).

13. The compute platform of claim 12, wherein the BMC includes one or more embedded trusted platform modules (TPMs).

14. The compute platform of claim 11, wherein the integrated boot support block includes a plurality of IO controllers, and wherein respective IO interfaces among the plurality of IO interfaces are integrated in or coupled to respective IO controllers.

15. The compute platform of claim 11, wherein the compute platform is a multi-socket compute platform where the CPU socket is a first CPU socket, further comprising a second CPU socket having a similar configuration as the first CPU socket including a plurality of sub-sockets and coupled to a second firmware storage device in which second platform firmware including second boot firmware is stored and coupled to a second management device,
   wherein the second CPU socket is configured to access the second boot firmware from the second firmware storage device and the integrated boot support block is configured to facilitate booting of each of the plurality of CPU sub-sockets in the second CPU socket.

16. A method implemented on a computing platform including a Central Processing Unit (CPU) socket comprising a plurality of core tiles partitioned into a plurality of clusters and operatively coupled to a firmware storage device in which platform firmware is stored, comprising:
   enumerating the plurality of clusters; and
   for each cluster that is enumerated,
      booting the cluster by loading and executing, via a bootstrap core tile for the cluster, a boot portion of the platform firmware stored in the firmware storage device, wherein each cluster comprises an independent boot domain.

17. The method of claim 16, wherein the CPU includes an integrated boot support block including a plurality of Input-Output (TO) interfaces, including an IO interface coupled to the firmware storage device and one or more IO interfaces coupled to a management component, further comprising receiving, at the integrated boot support block, boot signals from the management component.

18. The method of claim 17, wherein in connection with enumerating the plurality of clusters, each cluster is assigned a cluster ID, further comprising:
   using a plurality of packets to transfer boot firmware to each of the bootstrap core tiles, wherein the packets have a header including a cluster ID that is used by the integrated boot support block to forward packets containing boot firmware to the bootstrap core tiles based on the cluster ID associated with each of the bootstrap core tiles.

19. The method of claim 16, wherein the platform firmware comprises Unified Extensible Firmware Interface (UEFI) firmware and wherein the compute platform includes memory coupled to the CPU socket, further comprising:
   for each cluster that is enumerated,
      loading UEFI extended firmware components into a portion of memory allocated for the cluster and setting up the UEFI extended firmware components for runtime operations.

20. The method of claim 19, further comprising:
for each cluster that is enumerated,
   booting an operating system (OS) by loading an instance of the OS from a storage device coupled to the CPU socket or via a storage device that is accessed via a network interface coupled to the CPU socket,
wherein respective instances of the OS are booted for each cluster and loaded into a respective portion of memory allocated for each cluster.

* * * * *

UNITED STATES PATENT AND TRADEMARK OFFICE
CERTIFICATE OF CORRECTION

PATENT NO. : 12,204,912 B2  
APPLICATION NO. : 17/384447  
DATED : January 21, 2025  
INVENTOR(S) : Bharat S. Pillilli and Johan Van De Groenendaal Page 1 of 1

It is certified that error appears in the above-identified patent and that said Letters Patent is hereby corrected as shown below:

In the Claims

Claim 11 should read:
A computing platform comprising:
a firmware storage device in which platform firmware including boot firmware is stored;
a management device; and
a central processing unit (CPU) socket, including,
a plurality of core tiles;
an Input-Output (IO) tile, having an integrated boot support block and having a plurality of IO interfaces including at least one IO interface configured to receive boot signals from the management device and including an IO interface coupled via an IO link to the firmware storage device; and
logic for partitioning the plurality of cores tiles into a plurality of virtual clusters comprising CPU sub-sockets, wherein each CPU sub-socket is coupled to the IO tile,
wherein the CPU socket is configured to access the boot firmware from the firmware storage device and the integrated boot support block is configured to facilitate booting of each of the plurality of CPU sub-sockets.

Claim 17 should read:
The method of claim 16, wherein the CPU includes an integrated boot support block
including a plurality of Input-Output (IO) interfaces, including an IO interface coupled to the firmware storage device and one or more IO interfaces coupled to a management component, further comprising receiving, at the integrated boot support block, boot signals from the management component.

Signed and Sealed this  
Sixth Day of May, 2025

Coke Morgan Stewart  
*Acting Director of the United States Patent and Trademark Office*